United States Patent
Younes et al.

(10) Patent No.: US 10,818,100 B2
(45) Date of Patent: Oct. 27, 2020

(54) METHOD FOR PRODUCING A 3D SCATTER PLOT REPRESENTING A 3D EAR OF AN INDIVIDUAL, AND ASSOCIATED SYSTEM

(71) Applicant: Mimi Hearing Technologies GmbH, Berlin (DE)

(72) Inventors: Lara Younes, Rennes (FR); Corentin Guezenoc, Rennes (FR); Renaud Seguier, Acigne (FR)

(73) Assignee: Mimi Hearing Technologies GmbH, Berlin (DE)

( * ) Notice: Subject to any disclaimer, the term of this patent is extended or adjusted under 35 U.S.C. 154(b) by 0 days.

(21) Appl. No.: 16/344,341

(22) PCT Filed: Oct. 2, 2017

(86) PCT No.: PCT/EP2017/074987
§ 371 (c)(1),
(2) Date: Apr. 23, 2019

(87) PCT Pub. No.: WO2018/077574
PCT Pub. Date: May 3, 2018

(65) Prior Publication Data
US 2020/0051325 A1    Feb. 13, 2020

(30) Foreign Application Priority Data
Oct. 24, 2016 (FR) ...................... 16 60285

(51) Int. Cl.
*G06T 19/20* (2011.01)
*G06T 17/00* (2006.01)
*G06T 7/33* (2017.01)

(52) U.S. Cl.
CPC ............... *G06T 19/20* (2013.01); *G06T 7/33* (2017.01); *G06T 17/00* (2013.01); *G06T 2219/2021* (2013.01)

(58) Field of Classification Search
CPC ......... G06T 17/00–30; G06T 19/00–20; G06T 7/30; G06T 7/33
See application file for complete search history.

(56) References Cited

U.S. PATENT DOCUMENTS

| | | |
|---|---|---|
| 2015/0170416 A1 | 6/2015 | McGregor et al. |
| 2018/0204341 A1* | 7/2018 | Kaneko ............... A61B 5/1079 |
| 2018/0249275 A1* | 8/2018 | Ghorbal ................. H04S 7/303 |
| 2019/0087972 A1* | 3/2019 | Huttunen ............... G06T 19/20 |

FOREIGN PATENT DOCUMENTS

WO    2012/028906 A1    3/2012

OTHER PUBLICATIONS

Cadavid, Steven, Mohammad H. Mahoor, and Mohamed Abdel-Mottaleb. "Multi-modal biometric modeling and recognition of the human face and ear." 2009 IEEE International Workshop on Safety, Security & Rescue Robotics (SSRR 2009). IEEE, 2009. (Year: 2009).*

(Continued)

*Primary Examiner* — Daniel F Hajnik
(74) *Attorney, Agent, or Firm* — Polsinelli PC

(57) ABSTRACT

A method for generating a 3D point cloud representative of a 3D ear of an individual, from a first set of at least one 2D image of the ear, using a parametric 3D ear model is provided.

7 Claims, 3 Drawing Sheets

(56) References Cited

OTHER PUBLICATIONS

Lei, Jiajia, Xinge You, and Mohamed Abdel-Mottaleb. "Automatic ear landmark localization, segmentation, and pose classification in range images." IEEE Transactions on Systems, Man, and Cybernetics: Systems 46.2 (2015): 165-176. (Year: 2015).*

Bustard, et al., "3D morphable model construction for robust ear and face recognition", 2010 IEEE Computer Society Conference on Computer Vision and Pattern Recognition, pp. 2582-2589, Jun. 13, 2010.

Li, et al., "A novel 3D ear reconstruction method using a single image", Proceedings of the 10th World Congress on Intelligent Control and Automation, pp. 4891-4896, Jul. 6, 2012.

Chai, et al., "Pose Invariant Face Recognition under Arbitrary Illumination based on 3D Face Reconstruction", Audio- and Video-Based Biometric Person Authentication, pp. 956-965, Jun. 28, 2005.

* cited by examiner

METHOD FOR PRODUCING A 3D SCATTER PLOT REPRESENTING A 3D EAR OF AN INDIVIDUAL, AND ASSOCIATED SYSTEM

CROSS-REFERENCE TO RELATED APPLICATIONS

This application is a National Stage of International patent application PCT/EP2017/074987, filed on Oct. 2, 2017, which claims priority to foreign French patent application No. FR 1660285, filed on Oct. 24, 2016, the disclosures of which are incorporated by reference in their entirety.

FIELD OF THE INVENTION

The present invention relates to a method for generating a 3D point cloud representatives of a 3D ear of an individual, and to an associated system.

BACKGROUND

There have been many advances in virtual reality (acronym VR) applications using on-board hardware with the aim of immersing the user in a virtual environment. A VR experience requires the human brain to simultaneously interpret visual and audio data. Thus, the immersion experience is not limited to the graphical depiction of a scene but also requires the headset to recreate 3D sound, which is essential above all in the VR cinema and video-game applications or even in physical simulators.

Binaural synthesis is a technique for recreating spatialized sound in an audio headset that consists in reproducing the alterations (attenuations, reflections, diffractions) that the audio signal undergoes from its source to the entrance of the ear canals. Assuming the subject to be stationary, such alterations may be modelled, for each ear and each direction in space, by a linear system that is invariant over time, characterized by its head-related transfer function (HRTF). Since these alterations in the signal are directly related to the shape of the auricle, of the head and of the torso, HRTFs are specific to the morphology of each listener.

It is known to obtain such individual HRTFs by acoustic measurements, by placing small microphones in the ear canals of a subject and by measuring the impulse response for audio sources distributed in the space around the subject. However, such a method is relatively expensive to implement, in particular as it is necessary to use an anechoic chamber and a consequent measuring time, this making it difficult to envision using it for commercial applications.

Another approach consists in acquiring a three-dimensional or 3D mesh of the trunk of the listener and of calculating a set of HRTFs by means of a boundary element method (BEM), on the basis of this mesh. Providing the geometry is sufficiently precise, this approach allows a spatialized-sound location performance similar to that obtained with acoustic measurements to be achieved. This method allows commercial applications to be envisioned because it is much easier to scan a user than to place him in an anechoic chamber and to get him to remain immobile for a non-negligible length of time of more than 20 minutes.

Currently little work has been done with a view to 3D reconstruction of the ears from two-dimensional or 2D images.

Research into machine vision and computer graphics has paid specific attention to the reconstruction of human faces in three dimensions or 3D without providing solutions specifically related to the detailed reconstruction of ear shape.

SUMMARY OF THE INVENTION

One aim of the invention is to provide a method allowing a three-dimensional or 3D mesh of the ears of an individual to be constructed in a way that is both simple and reliable.

According to one aspect of the invention, a method is proposed for generating a 3D point cloud representative of a 3D ear of an individual, from a first set of at least one 2D image of said ear, using a parametric or parameterizable 3D ear model.

Thus, it is easy to reconstruct in 3D the ears from 2D images.

According to one implementation, the method comprises steps of:

selecting, in each 2D image of the first set, a second set of at least one 2D landmark of an ear;

registering, when the first set comprises at least two 2D images, each respective 2D landmark;

determining, or readjusting, values of postural parameters of the individual to whom the ear belongs during the capture of each 2D image of the first set and values of the parameters of the parametric 3D ear model, from, or on the basis of, the second set of at least one 2D landmark of an ear by minimizing a cost function with respect to weighted errors of distances between the estimated reprojection of a 3D vertex in the parametric ear model and the predicted location of the 2D landmark corresponding thereto as detected in the 2D image.

Thus, the weights of the weighted errors determine the contribution of each distance error in the minimization process. The 2D landmarks that are least reliable as regards their locations in the image will induce less error during the optimization.

In one implementation, the cost function corresponds to the sum of the weighted reprojection errors associated with the 2D landmarks.

According to one implementation, the respective weighting of a reprojection error associated with a 2D landmark depends on its relative difficulty to find it.

The 2D landmarks in the image, the detection of which is reliable, are those that are located on the high-curvature contours of the inner ear. Points on the outer ear are more difficultly adjustable to their precise anatomic location on the low-curvature contours in the image.

Thus, the weighting process allows the case of occultation of certain portions of the ear in the image to be taken into account, thus removing the contribution of a 2D landmark if the latter is not found in the image, for example.

According to one implementation, the more difficult a 2D landmark is to find, the lower the weighting of the reprojection error that is associated therewith.

In one implementation, the second set of at least one characteristic 2D landmark of an ear comprises at least one point of the tragus, and/or at least one point of the antitragus, and/or at least one point of the helix, and/or at least one point of the anti-helix.

Thus, the characteristics of the inner ear and those of the outer ear are taking into consideration in the reconstruction of the shape of said ear.

According to one implementation, the method furthermore comprises a step consisting in estimating a set of head-related transfer functions that is adapted to said ear using a boundary element method on the basis of the preceding steps.

Thus, the method allows the aforementioned transfer functions to be personalized from 2D images, which are easily accessible even to a nonspecialist user.

According to another aspect of the invention, a system is proposed for generating a 3D point cloud representative of a 3D ear of an individual, from a first set of at least one 2D image of said ear, using a parametric 3D ear model, comprising a computer configured to implement the method such as described above.

BRIEF DESCRIPTION OF THE DRAWINGS

The invention will be better understood on studying a few embodiments that are described by way of completely nonlimiting example and that are illustrated in the appended drawings, in which.

DETAILED DESCRIPTION

Figure 3:
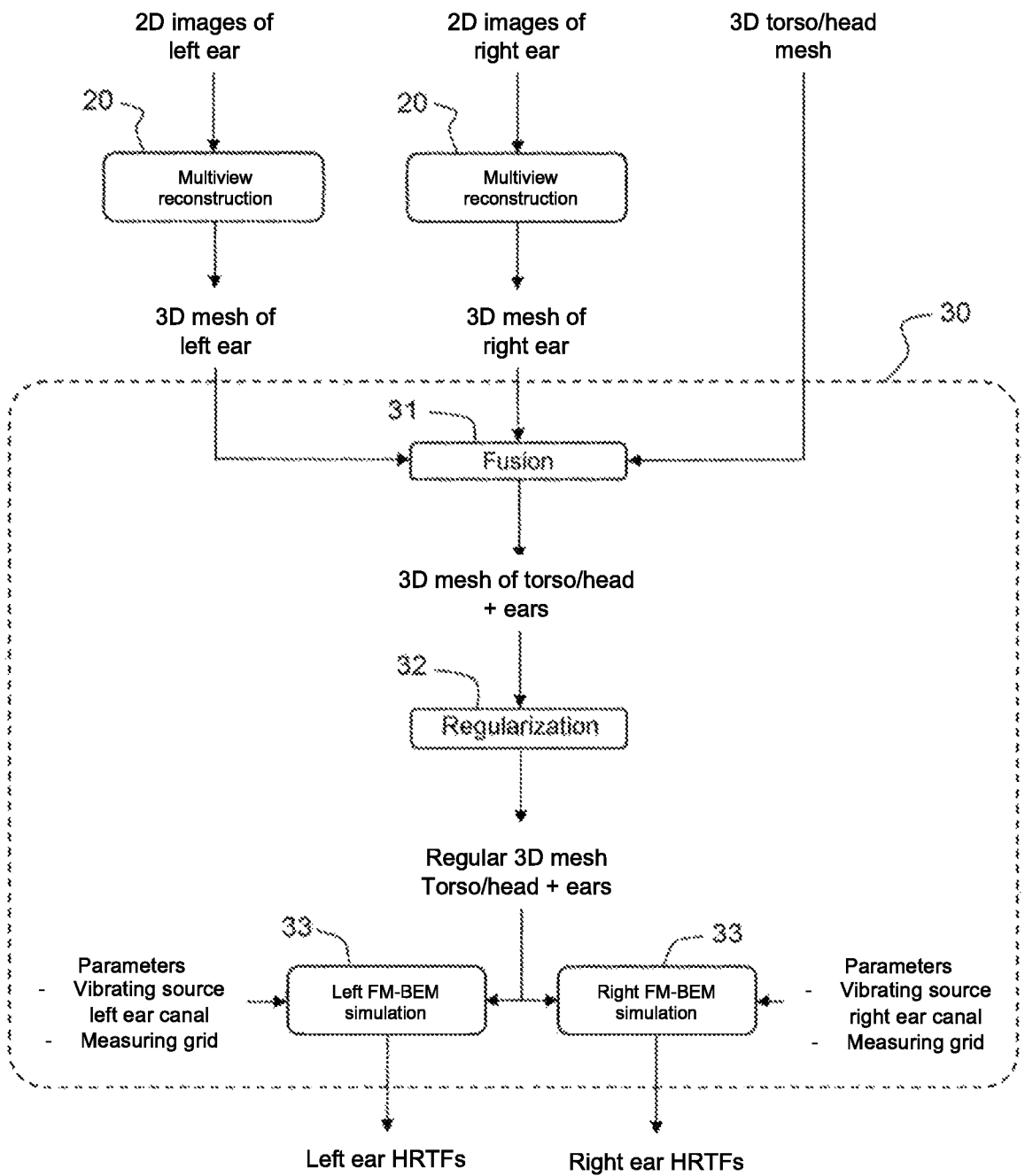
FIG. 3 schematically illustrates one implementation of the method in the context of estimation of an HRTF, according to one aspect of the invention.

FIG. 3 schematically illustrates one implementation of a method 20 in the context of estimation of an HRTF, according to one aspect of the invention.

Figure 2:
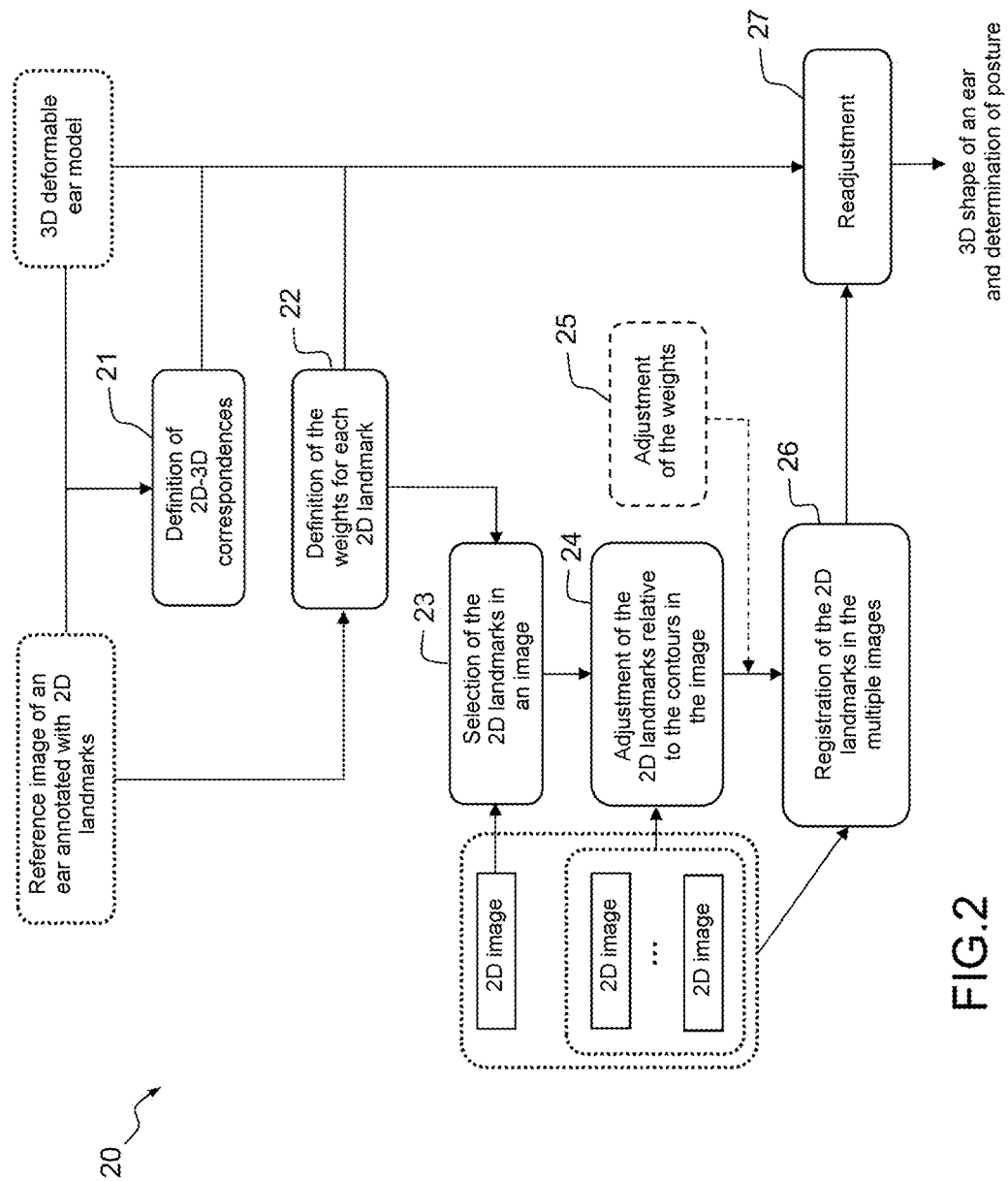
FIG. 2 schematically illustrates one implementation of the method according to one aspect of the invention.

FIG. 2 illustrates the method 20 for generating a 3D point cloud representative of a 3D ear of an individual, from a first set of at least one 2D image of said ear, using a parametric 3D ear model.

Reproducing a relief by reconstructing the 3D structure of an object requires at least two 2D images. The human visual system establishes geometric relationships by exploiting correspondences between 2D images. The structure from motion technique allows the 3D reconstruction of an object simultaneously with the calibration of the cameras providing the multiple images used. The structure from shading technique for its part exploits regions of illumination and shadow in the 2D images to reproduce the relief. This requires a suitable study of illumination and reflectance properties, and of variations in the degrades of shadows in the images.

These two techniques allow concave surfaces to be reconstructed, and are based on the tracking of points representing salient features, such as outlines, corners or zones of uniform color intensities, extracted from the photometric content of the images and/or on knowledge of the calibration of the cameras. They are robust in applications using ordered sequences of images or videos in which the tracking of this information is possible or when the acquisition process is controlled. However, being based mainly on texture, they may fail in the reconstruction of details of certain occulted morphological elements extracted from the shapes of the ears and that are related to the anatomy of the ear. Model-based methods are preferred for this type of problem and allow the reconstruction of the complete shape on the basis of a statistical model and of the analysis of the content of the image. This type of method is used in the present invention and anatomical elements such as the tragus, anti-tragus, intertragic notch, and points on the outlines of the helix, the earlobe or lobule and the scapha are the primitives, in the image, used.

Figure 1:
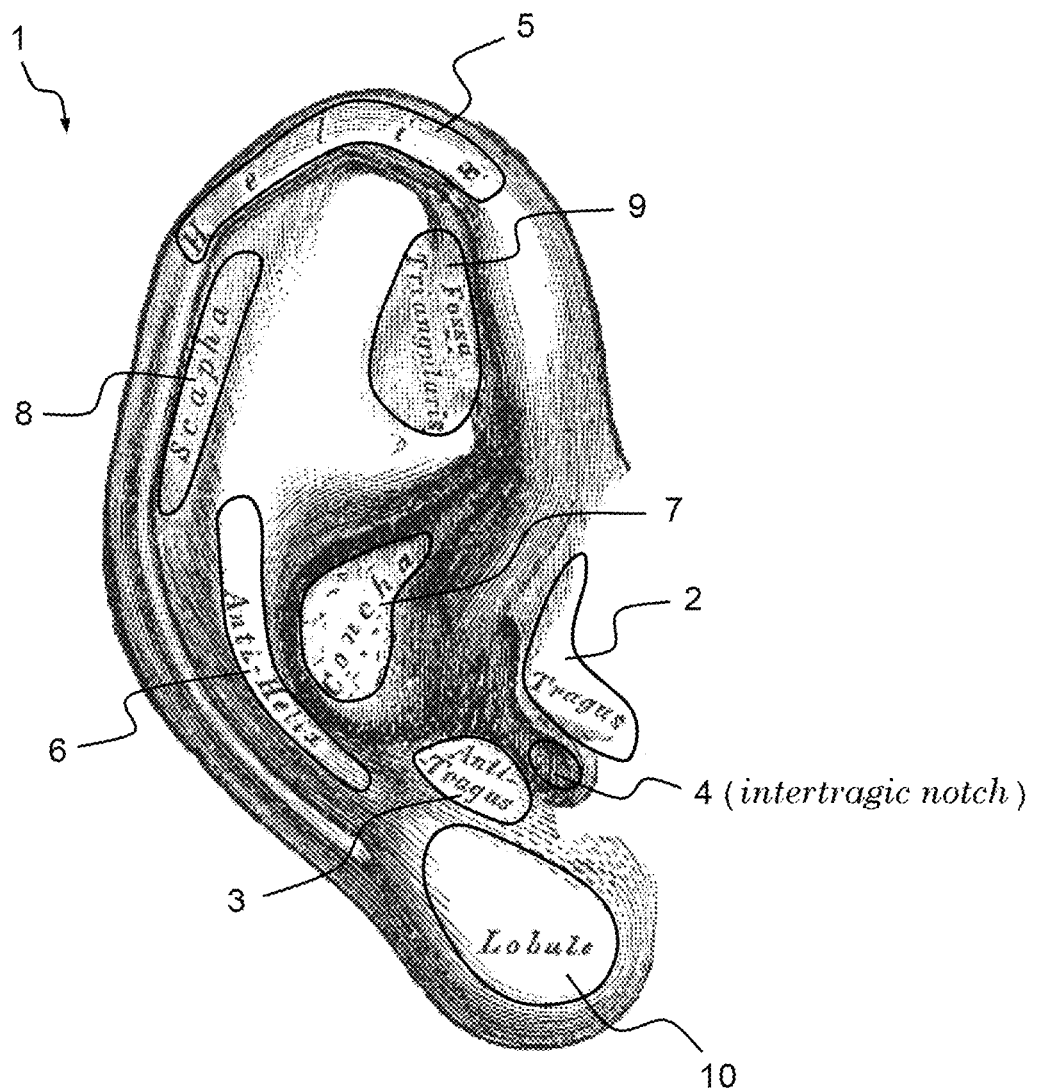
FIG. 1 schematically illustrates characteristic zones of an ear.

FIG. 1 illustrates various characteristic regions of an ear 1, such as the tragus 2, the anti-tragus 3, the intertragic notch 4, the helix 5, the anti-helix 6, the concha 7, the scapha 8, the fossa triangularis 9, and the lobule or earlobe 10.

For a plurality of subjects, the reconstructed 3D ears are fused with data representing the torso/head together, the composite mesh thus obtained is used to calculate a set of HRTFs called the reconstructed set of HRTFs.

The quality of the reconstructed ears is then evaluated. Firstly, an objective and purely quantitative comparison is carried out by metric comparison of the mesh of the scanned ear and of the mesh of the 3D ear obtained by reconstruction. The scanned ear comes from the database of 3D ear shapes serving to calculate the parametric model. This comparison allows the similarity of the reconstructed 3D point cloud with respect to the scan to be evaluated in order to judge the quality of the reconstruction. It is therefore a question of proving the effectiveness of the method by evaluating it against all the true 3D ear shapes of individuals used for the construction of the parametric model.

Next the quality of the reconstruction is evaluated in the context of the calculation of individualized HRTFs. For each subject for which a reconstructed set of HRTFs has been calculated, three additional sets of HRTFs are calculated, which will serve as references for the comparison. These reference sets are calculated from other composite meshes, in which only the ears are changed. These sets of HRTFs are then evaluated for each subject by way of tests of location of spatialized sounds.

The deformable model or parametric model is constructed on the basis of a database of 3D scans of ears. In the present invention, it is a question of using a scanner specifically designed to scan the ear canal. The obtained result is a 3D mesh uniquely representing the shape of the ear. No information related to texture is available. A manual cleaning operation is carried out in order to keep similar content for all the exploited meshes. As a variant, this cleaning operation may be carried out automatically. By cleaning operation what is meant is the selection of points from among all of the points of the point cloud. A crucial step is necessary before the principal component analysis (PCA) for the construction of the deformable model. It is a question of dense registration of a maximum of vertices (3D representation of the coordinates of a point) of all the aligned examples of the database. This is achieved by taking into account local geometric characteristics of each 3D vertex of each example, in this case using the surface-patch-histogram-of-index-shape (SPHIS) method. The model is generated by principal component analysis PCA of the points retained by the dense registration.

Before presenting the method for readjusting the 3D model obtained from the 2D landmarks in an image, the analytical description of the deformable ear model will be recalled. Let there be M+1 examples in the database and let them be aligned by N vertices in each 3D mesh. The deformable model is defined so as to linearly represent a shape with 3D vertex-vectors respecting the following relationship:

$$S_{(3\times N)} = \overline{S}_{(3\times N)} + \Sigma_{j=1}^{M} p_j \cdot S_{j(3\times N)} \quad \text{(R1)}$$

in which:

S represents an N-vertex shape generated using the model;
$\overline{S}$ represents the average shape calculated on the basis of the 3D shapes of the database;

$S_j$, j varying from 1 to M, represents the deformation eigenvectors of the model, defined on the basis of the RCA; and $p_j$ is the weighting associated with each eigenvector.

Thus, one instance of the parametric model is obtained.

Each eigenvector corresponds to one deformation mode applied to the average shape (one deformation per vertex), which is defined statistically on the basis of the PCA of the examples of the database.

The present invention requires a set of landmarks to be located in a 2D image representing the morphological structure of an ear. Initially, in the image, the zone corresponding to the ear is detected using the method of Viola and Jones described in the document "Rapid object detection using a boosted cascade of simple features" in the Proceedings of the 2001 IEEE Computer Society Conference on Computer Vision and Pattern Recognition, 2001, CVPR 2001, volume 1, pages I-511-I-518 vol. 1, 2001.

After the zone corresponding to the ear has been identified in the image, the desired landmarks are detected 22.

There are several approaches to automatically locating 2D landmarks in images. Constrained local models (CLMs) are taught with local patches or zones of properties of pixels in the vicinity of predefined characteristic points of the object to be modeled in order to allow, by regression, parameters of the model representing a 2D shape in an image to be predicted and thus points representing this shape to be located in the image.

This approach constrained with local properties allows, contrary to the approaches used before (active appearance models are taught with all the pixels of the image delineating the shape to be classified), imprecisions related to illumination conditions and to potential occlusions in the image of an object, to be avoided.

Other methods for extracting 2D landmarks from 2D images may be implemented. It is possible to pay particular attention to the methods for extracting characteristic points from 2D images of ears especially used in biometric applications for the recognition of individuals from images of their ears, as described in "Ear biometrics: a survey of detection, feature extraction and recognition methods" by A. Pflug and C. Busch, 1(2):114-129, 2012.

The extraction of characteristic points or landmarks from 2D images is not a subject of the invention. A set of landmarks is identified beforehand, in a step 22, for example semiautomatically. The user is then invited to select these features in a reference image, in a step 23. The selected points are then adjusted to the closest position in the image defining a curvature extremum in its vicinity, in a step 24. This is inspired by the inherent property of the defined landmarks (at least one point of the tragus, and/or at least one point of the anti-tragus, and/or at least one point of the helix, and/or at least one point of the anti-helix), which are called 2D landmarks.

An optional step 25 allows weights to be adjusted allowing the weights associated with 2D landmarks that are not found in the image because of an occultation, for example, to be set to zero.

When these points are annotated in the reference image, the corresponding points in the other views of the ear of the same person are identified by correspondence based on the measurement of normalized cross correlations, in a step 26.

A multiview method for readjusting and deforming 3D models with a view to reconstructing 3D ear shapes is proposed, as illustrated in FIG. 2. In the image a configuration in orthographic projection is assumed, or, in other words, a projection along the direction orthogonal to the plane of the image. The acquisition of the 2D images of an ear is acquired at a distance larger than 1 meter from the device taking the 2D images.

Let K 2D landmarks be tracked in a set of V images of ears of a person. The 2D-3D correspondences are predefined by prior association of each 2D landmark with the 3D vertex that it represents, as illustrated in step 21. Sub-sampling of the 3D dense deformable model is firstly carried out in order to obtain a sub-model exclusively containing the vectors associated with the tracked vertices in the 2D images. Relationship (R1) of the model then reduces to:

$$\overline{S}_{(3\times K)} = \overline{\overline{S}}_{(3\times K)} + \Sigma_{j=1}^M p_j \cdot \hat{S}_{j(3\times K)} \quad (R3)$$

in which:

$\overline{S}_{(3\times K)}$ represents an ear shape, reduced to only K vertices, associated with the 2D landmarks, to be calculated from the sub-model;

$\overline{\overline{S}}_{(3\times K)}$ represents the average shape reduced to only K vertices associated with the 2D landmarks used for the reconstruction; and $\hat{S}_{j(3\times K)}$ is the $j^{th}$ deformation vector reduced to only K vertices associated with the 2D landmarks used for the reconstruction.

The readjustment, in step 27, is carried out by iteratively optimizing the parameter set with the objective of minimizing a cost function. It is a question of the reproduction error between the projection estimations of the vertices of the sub-model and their corresponding predicted 2D landmarks in the 2D images. It is then a question of simultaneously optimizing the vector of parameters $p=[p_1, \ldots, p_M]$ in order to obtain the shape of the ear in 3D, and the postural parameters $\Theta = \{r_{0_{(3\times1)}}, t_{0_{(3\times1)}}, \ldots, r_{V_{(3\times1)}}, t_{V_{(3\times1)}}\}$ corresponding to each of the V images used.

$r_{j_{(3\times1)}}$ is the rotation vector associated with the posture of the $j^{th}$ 2D image, and $t_{j_{(3\times1)}}$ is the translation vector associated with the posture of the $j^{th}$ image.

The estimated position of a 3D vertex of the sub-model for an image for which the associated posture is $\Theta_j = \{r_j, t_j\}$ must be aligned with the associated 2D landmark $$l_i = [l_{x_{i_j}}, l_{xy_{i_j}}]$$

in the $j^{th}$ 2D image. Let L be the orthographic projection matrix. The estimation of the 2D projection of the $i^{th}$ vertex is a vector $s_{i_j}$ such that:

$$s_{i_j} = L(p, \Theta_j; +\widehat{S^i} \sum_{k=1}^M p_k \cdot \widehat{S_k^i}) = L(p, \Theta_j; \widehat{S^i}) = \begin{bmatrix} u_{i_j} \\ v_{i_j} \end{bmatrix} \quad (R4)$$

in which:

L represents the orthographic projection;

p is the vector containing all the parameters of the model associated with the shape to be calculated;

$\Theta_j$ represents the parameters of the posture associated with the $j^{th}$ 2D image;

$\widehat{S^i}$ represents the $i^{th}$ vertex of the average shape;

$p_k$ represents the $k^{th}$ parameter associated with the $k^{th}$ deformation vector of the model;

$\widehat{S_k^i}$ represents the $i^{th}$ vertex of the $k^{th}$ deformation vector;

$u_{i_j}$ is the coordinate on the horizontal axis of the projection of the $i^{th}$ vertex in the $j^{th}$ image; and $V_{i_j}$ is the coordinate on the vertical axis of the projection of the $i^{th}$ vertex in the $j^{th}$ image.

The shape and posture parameters are calculated by minimizing the following reprojection error:

$$\operatorname{Argmin}(p, \Theta) \sum_{j=1}^{V} \sum_{i=1}^{K} \omega_i \cdot \left( \left(u_{i_j} - l_{x_{i_j}}\right)^2 + \left(v_{i_j} - l_{y_{i_j}}\right)^2 \right) \quad \text{(R5)}$$

in which:
Argmin represents the function that determines optimal arguments that minimize the function argumentwise;

$l_{x_{i_j}}$ is the coordinate on the horizontal axis of the $i^{th}$ 2D landmark in the $j^{th}$ image;

$l_{y_{i_j}}$ is the coordinate on the vertical axis of the $i^{th}$ 2D landmark in the $j^{th}$ image; and
$\omega_i$ is the weight attributed to the contribution, in the optimization of the error, associated with the $i^{th}$ 2D landmark.

The least squares problem is for example solved using the iterative Gauss-Newton method. A weight is assigned to each error in the coordinates u and V of a point, in step 22. This allows certain 2D landmarks to contribute less to the optimization. For example, a weight of 1 is given to 2D landmarks corresponding to features of the inner ear. These features have a morphological definition that is well defined in the anatomy of the ear, and detection thereof may be considered to be reliable because these 2D landmarks belong to high-curvature contours in the 2D image. A lesser weight, for example of 0.7, is given to 2D landmarks forming the outer ear. These features are more difficulty adjustable to their precise anatomical location. Their location on low-curvature contours may be subject to imprecisions.

The optimization of the cost function of relationship R5 allows the parameters of the model to be calculated. These parameters are used to generate, from the dense model of relationship R1, the 3D shape of the ear. The postures associated with the various views are also found.

Once the two ears of a subject have been reconstructed, they are attached to a mesh of his entire torso/head obtained by stereoscopic reconstruction. Specifically, the obtainment of a set of HRTFs by way of numerical simulations of acoustic propagation requires a closed mesh of the top of the body.

The trunk (torso/head) meshes of this study are obtained by stereoscopic reconstruction, for example from 75 photos of the subject. In order to best avoid the problems caused by hair during the reconstruction, the subjects for example wear a bathing cap.

The trunk and ear meshes are, for example, integrally assembled using the free software package Meshlab. Firstly, the two ear meshes are aligned on the trunk mesh using the alignment tool. Next, the ears are removed from the trunk mesh, then the free meshes are fused into a single mesh. Lastly, gaps in the mesh are filled using the Poisson surface reconstruction algorithm.

Finally the uniformity of the mesh is increased using, for example, the "Adaptive Remesher" tool of the open source software package OpenFlipper. The final mesh has an average edge length of about 1.8 mm and a maximum edge length of 2.9 mm. Thus, based on the rule of six elements per wavelength, this mesh may be used for BEM calculations for frequencies ranging up to 20 kHz.

The HRTFs are calculated using boundary element methods (BEMs). In order to guarantee the uniqueness of the solution to the Helmholtz equation that defines the problem, the formulation of Burton and Miller, such as described in "The application of integral equation methods to the numerical solution of some exterior boundary-value problems" in the Proceedings of the Royal Society of London A: Mathematical, Physical and Engineering Sciences, volume 323, pages 201-210, The Royal Society, 1971, is used.

By applying the principle of reciprocity as described in the document by Philip McCord Morse and K Uno Ingard, "Theoretical acoustics", Princeton University Press, 1968, computation time is drastically decreased.

In addition, the multilevel fast multipole method (FMM) as described in the document by Wolfgang Kreuzer, Piotr Majdak, and Zhengsheng Chen, "Fast multipole boundary element method to calculate head-related transfer functions for a wide frequency range" in The Journal of the Acoustical Society of America, 126(3): 1280-1290, 2009, is used, this allowing simulations to be carried out up to 20 kHz in a reasonable time.

To perform these simulations, the software package Coustyx from Ansol may be used.

In order to calculate the HRTFs of a subject, two simulations are carried out in steps 33, one for each ear. For each of these simulations, "virtual microphones" are placed on a sphere of a radius of one meter around the subject, while placing an audio source at the back of the ear canal of the ear in question. There are 2522 microphones, distributed every 5° for azimuths from 0° to 355° and every 5° for elevations from −90° to 90°. The audio source for its part is a vibrating area element. This vibration is defined by the edge conditions applied to this area element.

FIG. 3 schematically illustrates one implementation of the method 20 of FIG. 2, in the context of HRTF estimation. The method 20 such as described above allows a 3D left ear and a 3D right ear to be reconstructed, on the basis of which a fusion 31 with a torso/head model is carried out in order to obtain a torso/head and 3D-ears mesh that then undergoes a regularization 32 in order to obtain a uniform mesh. This regularization 32 consists in remeshing the 3D shape in such a way that the resulting mesh has edge lengths comprised between 0.5 mm and 3 mm.

The obtained torso/head and 3D-ears mesh then allows, via a simulating step 33 of boundary-element-method type, the parameters of which respectively define a vibratory source in the ear canal of the left ear and a vibratory source in the ear canal of the right ear, and a spherical grid of measurement points encompassing the mesh, a set of HRTFs to be obtained for the left ear and a set of HRTFs to be obtained for the right ear.

The steps of the method described above may be carried out by one or more programmable processors executing a computer program in order to execute the functions of the invention by operating on input data and generating output data.

A computer program may be written in any form of programming language, including compiled or interpreted languages, and the computer program may be deployed in any form, including in the form of a standalone program or in the form of a subprogram, element or other unit suitable for use in an operating environment. A computer program may be deployed to be executed on a computer or on a plurality of computers located at a single site or distributed over a plurality of sites and connected together by a communication network.

The preferred embodiment of the present invention has been described. Various modifications may be made without departing from the spirit and scope of the invention. Therefore, other implementations fall within the scope of the following claims.

The invention claimed is:

1. A method for generating a 3D point cloud representative of a 3D ear of an individual, from a first set of at least one 2D image of said ear, using a parametric 3D ear model, comprising steps of:
    selecting, in each 2D image of the first set, a second set of at least one 2D landmark of an ear;
    registering, when the first set comprises at least two 2D images, each respective 2D landmark;
    determining values of postural parameters of the individual to whom the ear belongs during the capture of each 2D image of the first set and values of the parameters of the parametric 3D ear model, from the second set of at least one 2D landmark of an ear by minimizing a cost function with respect to weighted errors of distances between the estimated reprojection of a 3D vertex in the parametric ear model and the predicted location of the 2D landmark corresponding thereto as detected in the 2D image.

2. The method as claimed in claim 1, wherein the cost function corresponds to the sum of the weighted reprojection errors associated with the 2D landmarks.

3. The method as claimed in claim 2, wherein the respective weighting of a reprojection error associated with a 2D landmark depends on its relative difficulty to find it.

4. The method as claimed in claim 3, wherein the more difficult a 2D landmark is to find, the lower the weighting of the reprojection error that is associated therewith.

5. The method as claimed in claim 1, wherein the second set of at least one characteristic 2D landmark of an ear comprises at least one point of the tragus, and/or at least one point of the anti-tragus, and/or at least one point of the helix, and/or at least one point of the anti-helix.

6. The method as claimed in claim 1, furthermore comprising a step consisting in estimating a set of head-related transfer functions that is adapted to said ear using a boundary element method on the basis of the preceding steps.

7. A system for generating a 3D point cloud representative of a 3D ear of an individual, from a first set of at least one 2D image of said ear, using a parametric 3D ear model, comprising a computer configured to implement the method as claimed in claim 1.

* * * * *